(12) United States Patent
Roll et al.

(10) Patent No.: US 7,637,366 B2
(45) Date of Patent: Dec. 29, 2009

(54) HIGH SPEED DIVERTER

(75) Inventors: Eric Roll, Huntington, IN (US); Klaus Daenzer, Fort Wayne, IN (US); Gregory C. Stroud, Huntington, IN (US); Breton C. Ranc, Huntington, IN (US); Allen R. Snodgrass, Columbia City, IN (US); Ronald Poulson, Warren, IN (US)

(73) Assignee: Shuttleworth, Inc., Huntington, IN (US)

( * ) Notice: Subject to any disclaimer, the term of this patent is extended or adjusted under 35 U.S.C. 154(b) by 215 days.

(21) Appl. No.: 11/146,497

(22) Filed: Jun. 6, 2005

(65) Prior Publication Data

US 2005/0269185 A1 Dec. 8, 2005

Related U.S. Application Data

(60) Provisional application No. 60/577,123, filed on Jun. 4, 2004.

(51) Int. Cl.
*B65G 47/10* (2006.01)
*B65G 47/46* (2006.01)

(52) U.S. Cl. ............... 198/370.09; 198/370.01; 198/368

(58) Field of Classification Search ............ 198/370.09, 198/370.01, 368
See application file for complete search history.

(56) References Cited

U.S. PATENT DOCUMENTS

| | | | |
|---|---|---|---|
| 3,104,004 A | 9/1963 | Pole et al. | |
| 3,138,238 A * | 6/1964 | De Good et al. | ............ 198/367 |
| 3,191,747 A | 6/1965 | Bayer | |
| 3,232,417 A | 2/1966 | Muller | |
| 3,291,279 A | 12/1966 | DeGood et al. | |
| 3,429,417 A | 2/1969 | DeGood et al. | |
| 3,515,254 A | 6/1970 | Gary | |
| 3,791,518 A | 2/1974 | Vanderhoof | |
| 3,951,255 A | 4/1976 | Shuttleworth et al. | |
| 3,955,678 A | 5/1976 | Moyer | |
| 3,983,988 A | 10/1976 | Maxted et al. | |
| 4,200,178 A | 4/1980 | Gunti | |
| 4,214,663 A | 7/1980 | Schoppet et al. | |
| 4,328,889 A | 5/1982 | Maxted | |
| 4,369,873 A | 1/1983 | Heuft | |
| 4,541,520 A | 9/1985 | Greenlee, III | |
| 4,572,350 A | 2/1986 | Besemann | |
| 4,633,996 A | 1/1987 | Waterhouse | |
| 4,730,718 A | 3/1988 | Fazio et al. | |

(Continued)

FOREIGN PATENT DOCUMENTS

AU    B-14429/83    11/1983

(Continued)

*Primary Examiner*—Gene Crawford
*Assistant Examiner*—Ramya Prakasam
(74) *Attorney, Agent, or Firm*—John V. Daniluck; Bingham McHale LLP

(57) ABSTRACT

Apparatus and methods for diverting objects to a second path from a first path. Some embodiments include an articulatable diverting member coupled to an endless loop placed at an oblique angle above the first path of the conveyor. The diverting members are selectively placed in either a retracted position or an extended position based on sensory knowledge of the particular objects passing underneath the endless member. In the extended position, the diverting members contact the particular objects and slide them to the second path. In the retracted position, the conveyed objects pass underneath the diverting member.

12 Claims, 18 Drawing Sheets

U.S. PATENT DOCUMENTS

| | | | |
|---|---|---|---|
| 4,738,347 A | | 4/1988 | Brouwer et al. |
| 4,792,034 A | * | 12/1988 | Leemkuil ............... 198/370.09 |
| 4,798,275 A | | 1/1989 | Leemkuil et al. |
| 4,880,099 A | | 11/1989 | Leemkuil et al. |
| 4,962,841 A | | 10/1990 | Kloosterhouse |
| 5,029,693 A | * | 7/1991 | Williams ............... 198/370.09 |
| 5,048,665 A | | 9/1991 | Vickers |
| 5,058,723 A | | 10/1991 | Hosch |
| 5,086,906 A | | 2/1992 | Ludke |
| 5,127,510 A | | 7/1992 | Cotter et al. |
| 5,165,516 A | | 11/1992 | Reed et al. |
| 5,191,959 A | | 3/1993 | Leemkuil |
| 5,201,401 A | | 4/1993 | Haderer et al. |
| 5,275,273 A | | 1/1994 | Veit et al. |
| 5,423,409 A | | 6/1995 | Wipf |
| 5,538,127 A | | 7/1996 | Becker et al. |
| 5,551,543 A | | 9/1996 | Mattingly et al. |
| 5,699,891 A | | 12/1997 | Gosdowski et al. |
| 5,743,379 A | | 4/1998 | Warnecke |
| 5,868,238 A | | 2/1999 | Bonnet |
| 5,967,289 A | | 10/1999 | Kelsey |
| 5,971,132 A | | 10/1999 | Bonnet |
| 5,971,133 A | * | 10/1999 | Wilkins ................ 198/370.09 |
| 6,005,211 A | | 12/1999 | Huang et al. |
| 6,016,903 A | | 1/2000 | Lochbrunner |
| 6,076,653 A | | 6/2000 | Bonnet |
| 6,098,786 A | | 8/2000 | Brumm et al. |
| 6,193,047 B1 | | 2/2001 | Brumm et al. |
| 6,230,872 B1 | | 5/2001 | Huang et al. |
| 6,264,042 B1 | | 7/2001 | Cossey, Jr. et al. |
| 6,279,224 B1 | | 8/2001 | Wirtz et al. |
| 6,516,937 B1 | | 2/2003 | Deer |
| 6,516,940 B1 | | 2/2003 | Hart et al. |
| 6,543,602 B1 | | 4/2003 | Bonnet |
| 6,595,349 B2 | | 7/2003 | MacSwan |
| 6,612,425 B1 | | 9/2003 | Garvey |
| 6,619,465 B1 | * | 9/2003 | Gebhardt ............... 198/370.09 |
| 6,644,459 B2 | | 11/2003 | von Leeuwen et al. |
| 6,685,010 B2 | | 2/2004 | Warnecke |
| 6,688,459 B1 | | 2/2004 | Bonham et al. |
| 2002/0079253 A1 | | 6/2002 | Lem et al. |
| 2003/0079971 A1 | | 5/2003 | Veit |
| 2003/0132143 A1 | | 7/2003 | Cochran et al. |
| 2003/0209405 A1 | | 11/2003 | Greve et al. |

FOREIGN PATENT DOCUMENTS

| | | |
|---|---|---|
| AU | B-28420/84 | 1/1985 |
| CH | 396764 | 1/1966 |
| DE | 1137675 | 10/1962 |
| DE | 1481006 | 2/1969 |
| DE | 2940014 | 11/1980 |
| EP | 0094012 | 9/1987 |
| EP | 0144355 | 8/1988 |
| FR | 2668758 | 5/1992 |
| GB | 488145 | 7/1938 |
| GB | 919544 | 2/1963 |
| GB | 1090630 | 11/1967 |
| WO | 84/04740 | 12/1984 |
| WO | WO 84/04740 | 12/1984 |

* cited by examiner

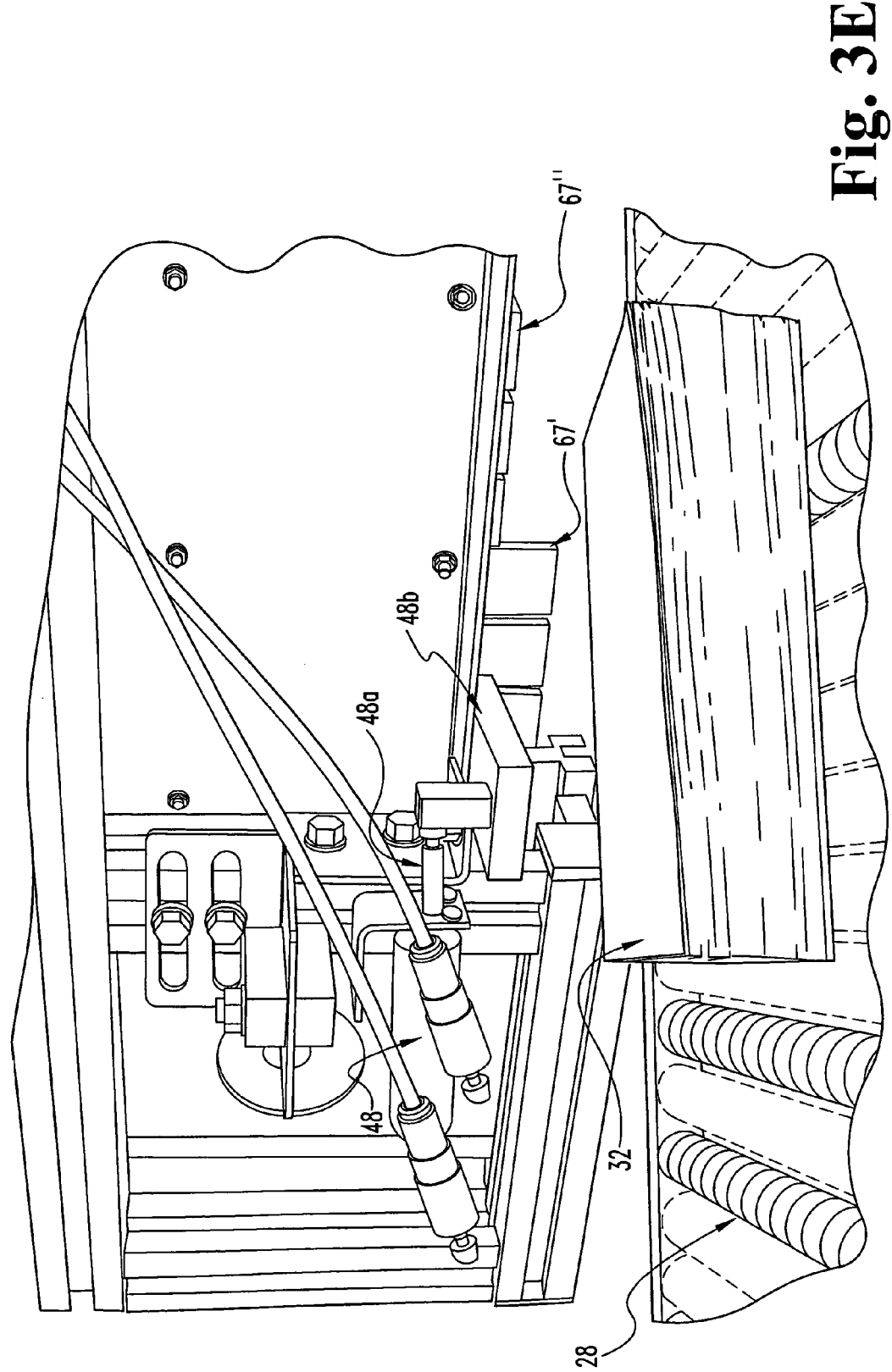

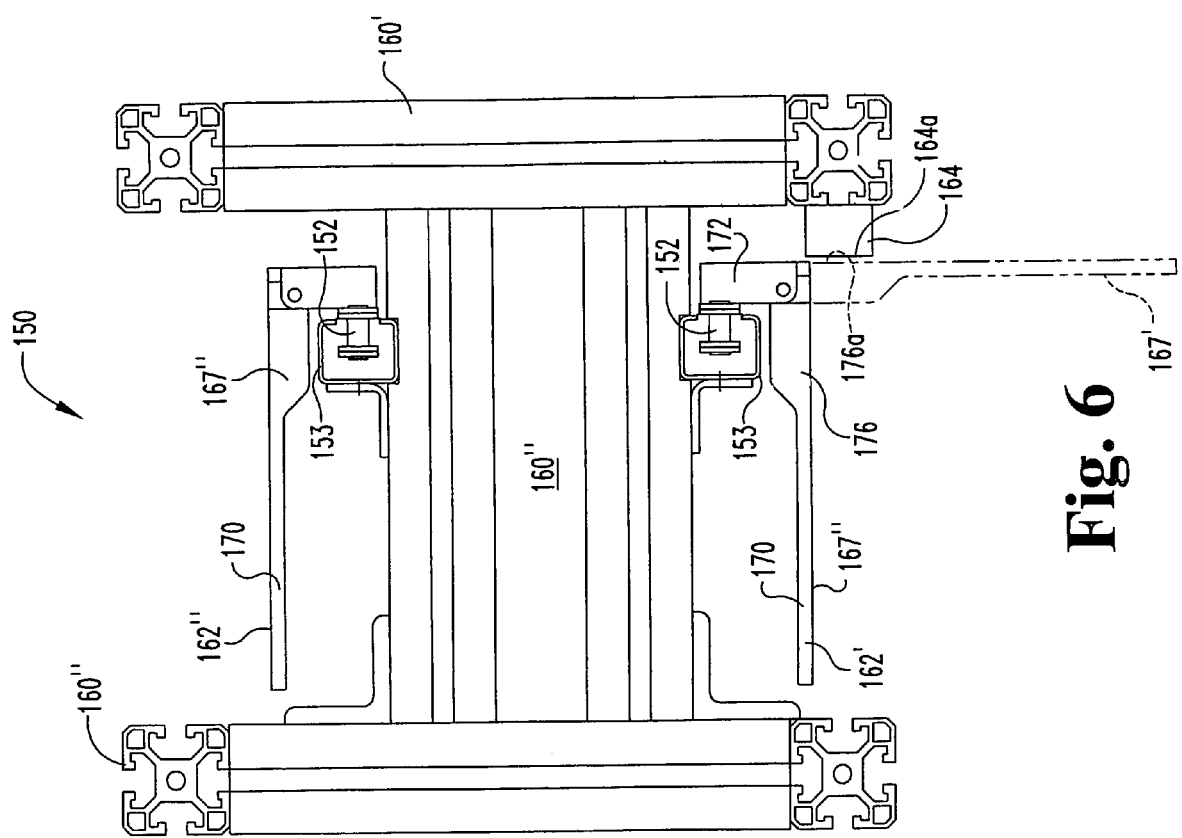

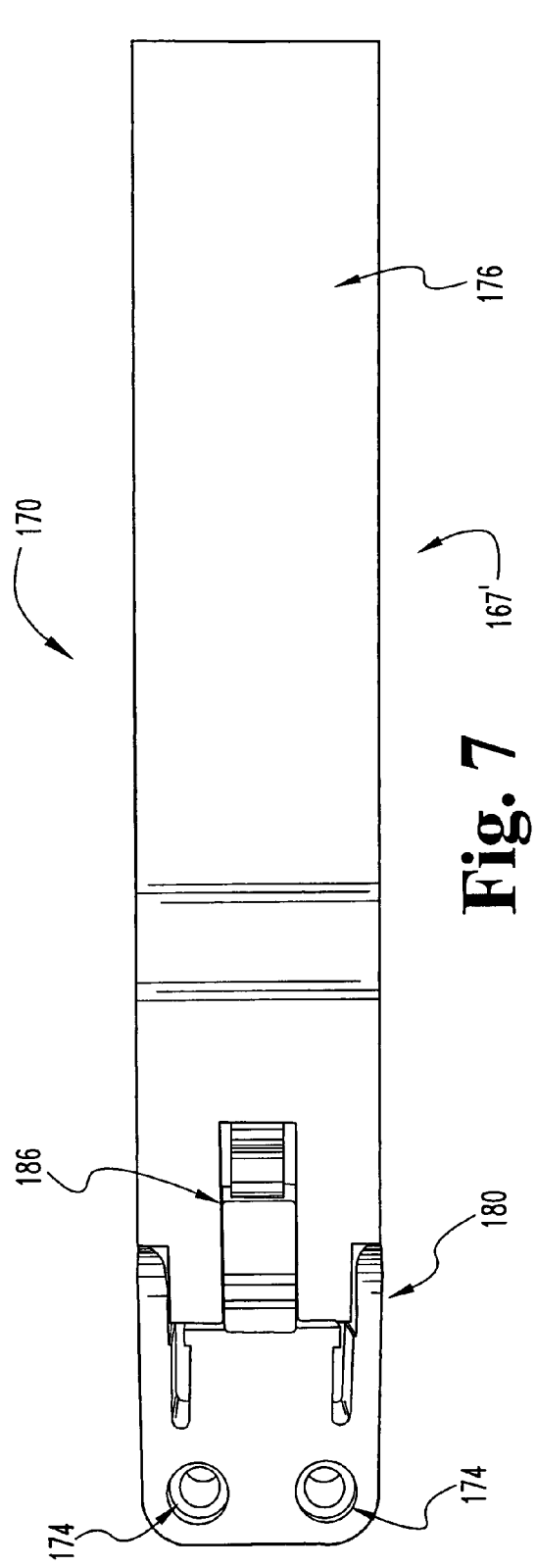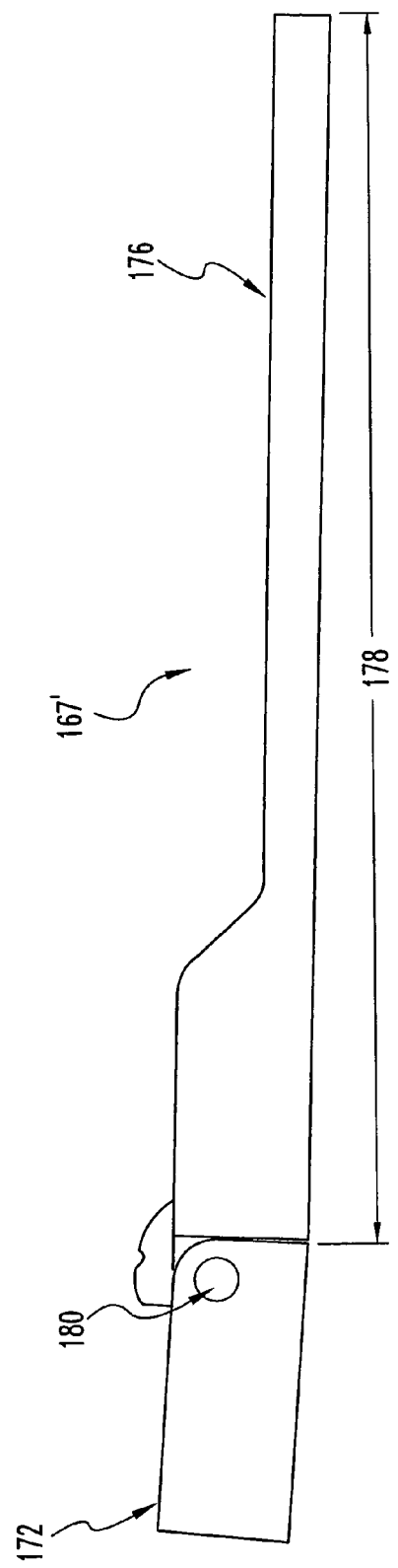

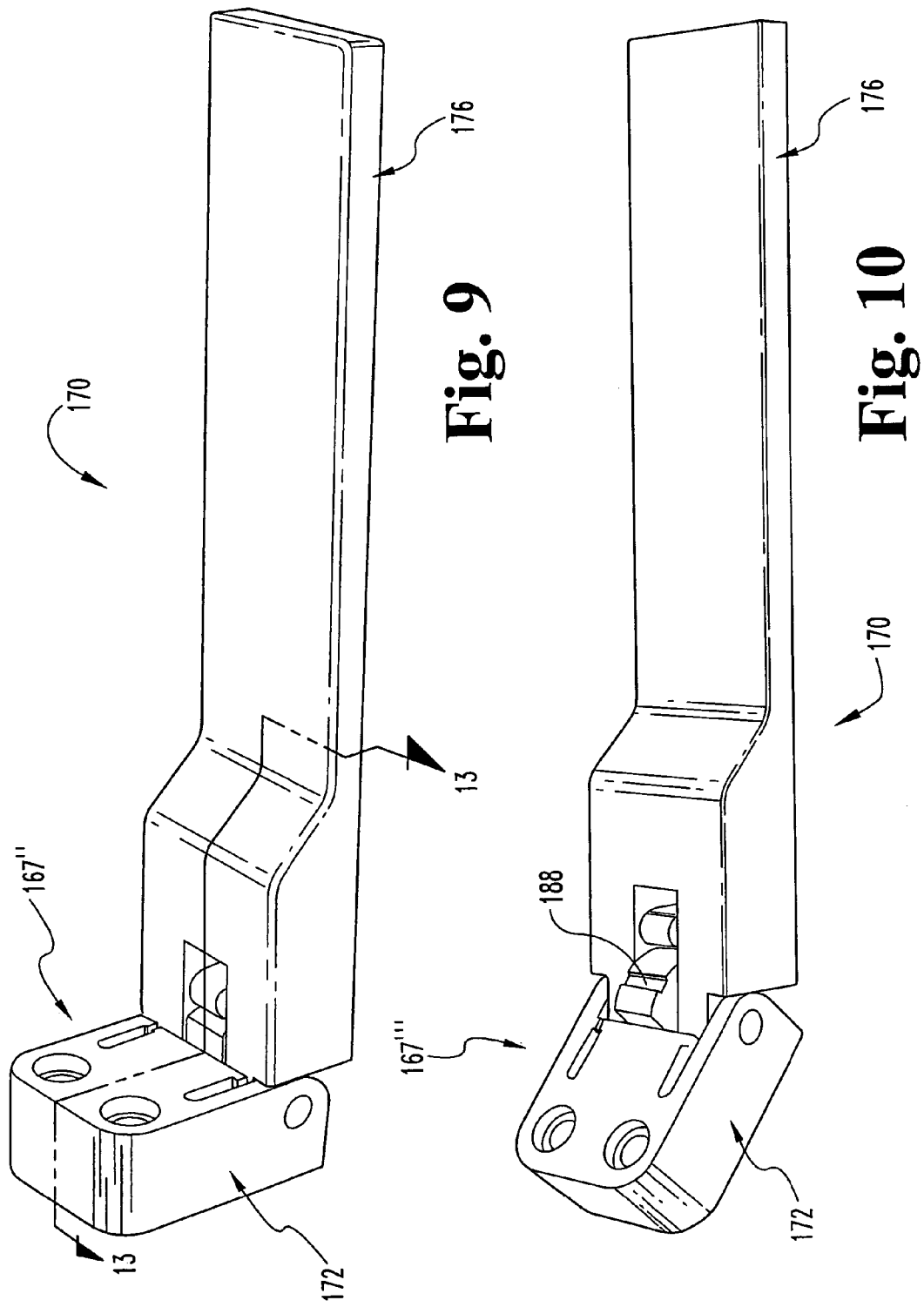

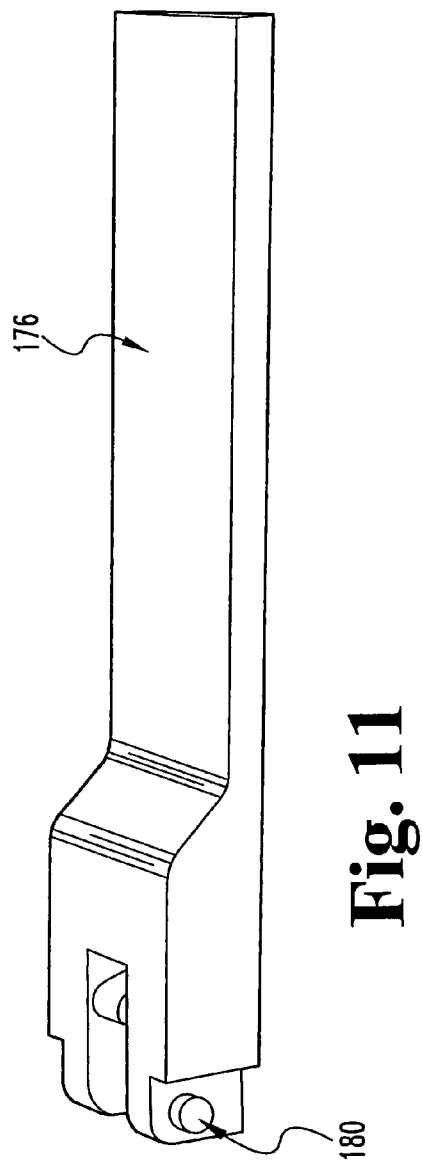
Fig. 11
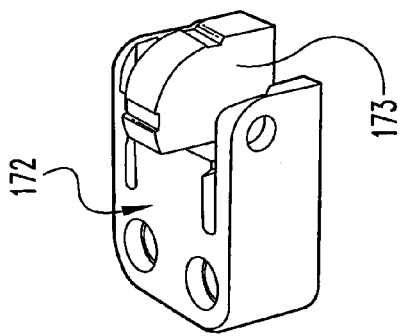
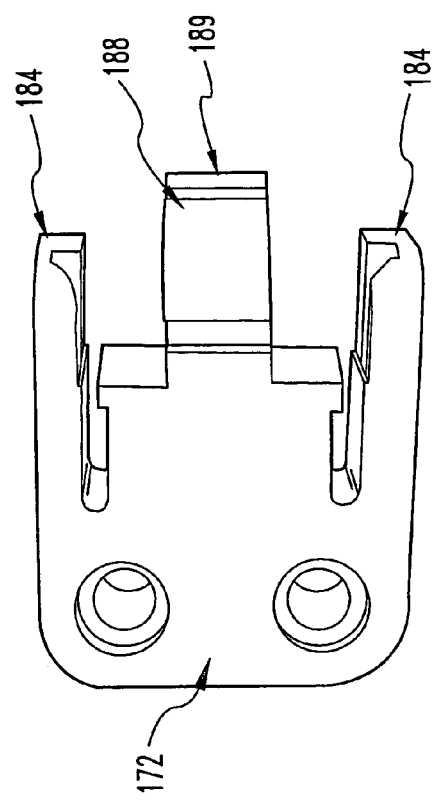
Fig. 12

HIGH SPEED DIVERTER

This application claims the benefit of priority of U.S. provisional applications Ser. No. 60/577,123, filed Jun. 4, 2004, incorporated herein by reference.

FIELD OF THE INVENTION

The present invention pertains to methods and apparatus for diverting products on a conveyor, and especially relates to high speed diversion of products on a slippable roller conveyor.

BACKGROUND OF THE INVENTION

It is often necessary to sort objects being conveyed on a conveyor. The sorting may be necessitated by downstream events (such as too little or too much product at a subsequent station), by the need to separate objects based on their identity (which can be indicated by a bar code), for separation of objects based on their final destination, or for other reasons. Further, the objects may be conveyed in an irregular pattern, with irregular spacing or irregular product orientation. For any or all of these reasons, or for other reasons, it may be desirable to quickly determine which specific objects in a group of objects are to be diverted from one conveying path to another conveying path, and to accomplish that diversion without affecting the non-selected objects.

The various embodiments of the invention shown and described herein provide novel and unobvious ways to divert products from one conveyor path to another conveyor path.

SUMMARY OF THE INVENTION

In some embodiments, the present invention relates to apparatus and methods for diverting objects being conveyed along a path.

In some embodiments, the present invention includes a diverting mechanism with actuatable divertable members arranged in a loop. In some embodiments the entire loop is above the conveying surface. In other embodiments an object-diverting portion of the loop is above the conveying surface and a paddle-return portion of the loop is below the conveying surface.

And yet other embodiments, the present invention pertains to methods and apparatus for returning a diverter member from an arbitrary position to a predetermined initial position. In some embodiments the method and apparatus pertain to moving a pivotable member from an extended position to a retracted position.

Other embodiments of the present invention pertain to methods and apparatus for limiting the overtravel of a diverting member as it is moved from one position to another position.

Yet other embodiments of the present invention pertain to methods and apparatus for high speed diversion of products on a slippable roller conveyor to minimize the damage to the conveyed product as it is diverted.

Yet other aspects of various embodiments of the present invention can be found in the drawings, detailed description, and claims to follow.

DESCRIPTION OF THE DRAWINGS

FIG. 3E is a side perspective view of a portion of the system of FIG. 1.

FIG. 6 is a view of the apparatus of FIG. 4 as taken along line 6-6 of FIG. 4

FIG. 7 is a top plan view of a paddle assembly according to one embodiment of the present invention.

FIG. 8 is a side elevational view of the paddle of FIG. 7.

FIG. 9 is a side and top perspective view of the paddle of FIG. 7 shown in a fully retracted position.

FIG. 10 is a side and top perspective view of the paddle assembly of FIG. 7 as shown in a partially retracted position.

FIG. 11 is an exploded view of the paddle assembly of FIG. 7.

FIG. 12 is a top perspective view of the connector of FIG. 11.

DESCRIPTION OF THE PREFERRED EMBODIMENT

Figure 1:
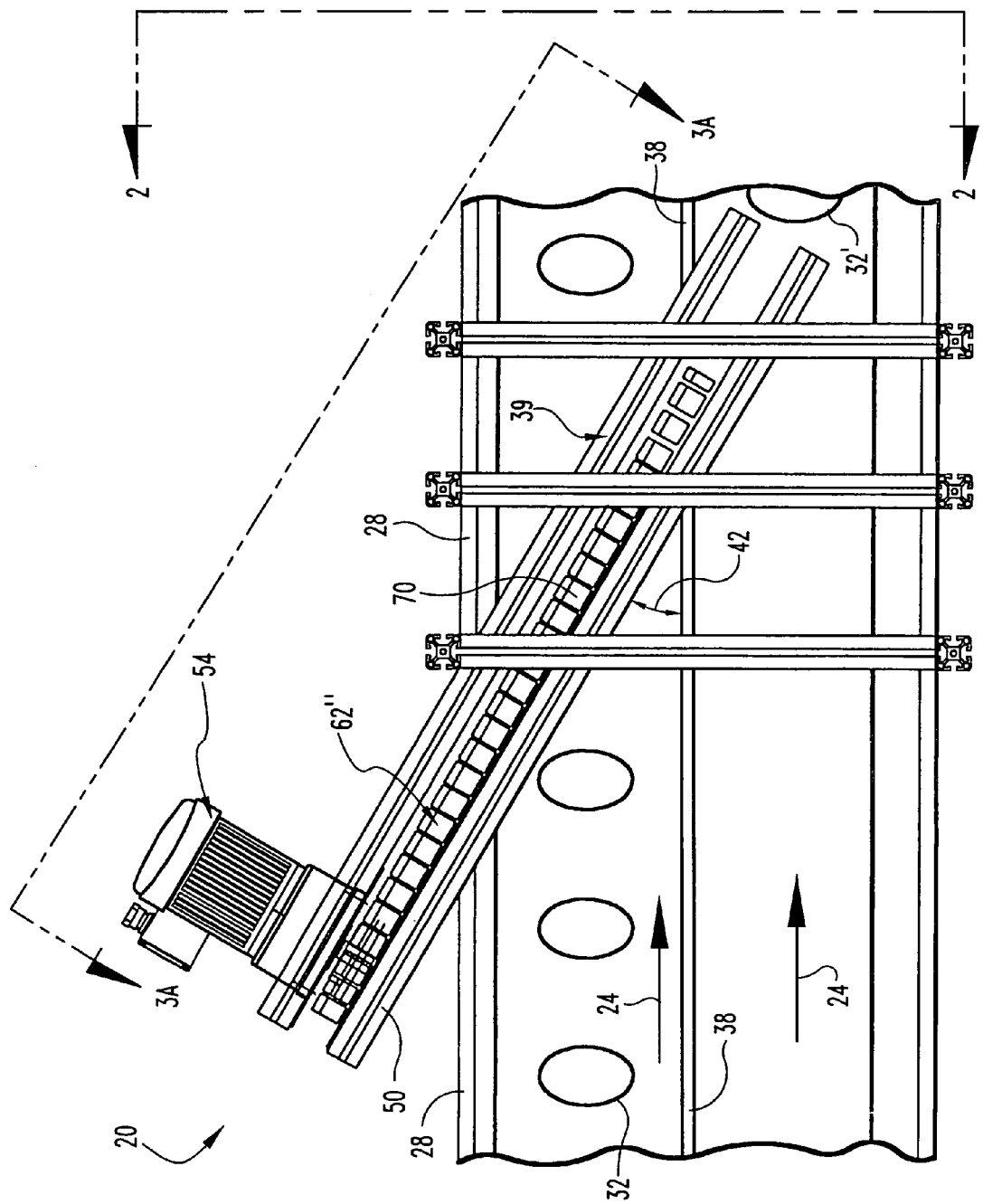
FIG. 1 is a top view of a conveying system according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Various of embodiments of the present invention pertain to methods and apparatus for diverting a stream of products being conveyed along a conveyor. In some embodiments the diverter assembly is located above the conveying path, such that the paddle assemblies of the diverter, when fully extended, have a distal end which is located close to the conveying path, but located above the conveying path. In yet other embodiments, the distal end of the paddle assembly in the fully extended position has a distal end that is located below the conveying path of the conveyor, especially for those conveyors in which one or more rollers have been removed from the corresponding roller shafts.

Some embodiments of the present invention pertain to a conveyor system including a conveyor, diverter member, actuator, product sensors, and an electronic controller. The sensors are located upstream of the diverting assembly, and provide product information such as the number of products, spacing of products, height of products, or type of product (such as information from a bar code reader), as examples. Information from the sensor is received by an electronic controller, such as a digital controller, which determines whether a particular product should remain traveling in its current path, or if it should be diverted to a second path. The second path can be parallel to the original path, or angled away from the original path. The controller, knowing the speed and location of the product, and also knowing whether or not the product should be diverted, sends a signal to an actuator which causes a member of the diverting assembly to be position such that the desired affect takes place. For those products to be diverted, the member is placed in a position where it contacts the targeted product as the product moves along the original surface path on the conveyor. For those products which are not targeted (i.e. those products which are to remain traveling along the original path), the member is placed in a position such that it does not contact the conveyed product.

The present invention contemplates diverter assemblies in which the initial position of a diverter member is extended so as to contact and divert the product. In these embodiments, the actuator would position the member to a retracted position for those products which are to remain on the original path. In a preferred embodiment, the diverter members are initially placed in a retracted position such that the actuator places the diverting member in a position so as to contact and thereby divert the product as it reaches the diverting assembly.

Preferably, the diverting assembly is placed at an angle relative to the conveying path. In some embodiments, the diverting assembly includes a recirculating loop of diverting members, for example diverting members coupled to a chain rotating on a pair of sprockets, although the present invention also contemplates the use of an endless member such as a toothed belt.

In a preferred embodiment, the recirculating loop of diverting members is placed above the conveying path. In yet other embodiments, one path of the loop is above the conveying path and the other path of the loop is below the conveying path. In those embodiments, the portion of the loop above the conveying path carries those diverting members which are intended to divert products. The lower path is a return path where all diverting members are placed in a known, initial position and returned back to the top path of the loop.

In some embodiments of the present invention the return path of the loop includes means for returning an actuated diverting member to a known position. In one embodiment, the means for returning includes a stationery member that is placed such that a diverting member not in the desired initial position will contact the stationery member as the diverting member moves with the loop. The stationery member is preferably placed proximate to the return path so that a portion of the diverting member touches the stationery member and slides along a surface of the stationery member as the path moves. The stationery member is adapted and configured such that the relative movement between the stationery member and the diverting members results in a diverting member moving from its current, actuated position to the desired initial position. In one embodiment, the stationery member is spaced apart from the return path and angled relative to the return path.

Other embodiments of the present invention include one or more stationery members for limited the overtravel of the pivotal portion of a pivoting diverting member. In one embodiment, the actuator, as commanded by the electronic controller, causes a portion of a diverting member to pivot about 90 degrees from a retracted position to an extended position. Located along the recirculating loop, and placed proximate to the location of the actuation, is a static member which is adapted and configured to be contacted by the pivoting portion if the pivoting portion overtravels. In contrast to other designs, the overtravel is preferably not limited by contact between the pivoting portion of the diverting member and the non-pivoting portion of the diverting member. In such other designs the reaction of the overtravel loads against the non-pivoting portion causes stress in the non-pivoting portion which can lead to failure.

In other embodiments of the present invention, there is a stationery member which is adapted and configured to limit overtravel of the pivoting portion of a diverting member as that diverting member is returned to the desired initial position as it travels along the return path of the loop. Preferably, this stationery member contacts the pivoting portion of a diverting member. Preferably, the stationery member reduces or eliminates any loads imposed by overtravel as the pivoting portion returns to its desired initial position.

Other embodiments to the present invention pertains to an actuating diverting member located above the path of the conveyor. The diverting member includes a paddle portion pivotal between a retracted position and an extended position. In the retracted position, objects being conveyed pass underneath the diverting member and remain on their present path of travel. If the diverted member is actuated to the extended position, the paddle is adapted and configured such that the distal end of the extended paddle is at a height lower than the center of gravity of the product be diverted, yet above the surface path of the conveyor. By extending the length to a position below the product's center of gravity, the stability of the diverted product is enhanced.

One embodiment of the present invention includes an endless loop of paddles (diverting members) engaged by a system input. The length of the diverted product is measured and converted to an output that engages the appropriate number of paddles to create a specially sized moving guide. This provides smaller gaps between products, as well as the flexibility to accept randomly spaced products.

Some embodiments of the present invention include a high-speed diverting capability that can increase production rates and also gently handling the products. Some embodiments accept an assortment of package types of various sizes with random spacing. As one example, a 10-inch product can be divided from one lane into two lanes at a rate of 200 products per minute. Based on system speeds and inputs (bar code reading, sensors, controls), some embodiments can increase or decrease the rate of throughput to meet the throughput requirements of the line.

Some embodiments of the present invention can perform automatic sortation and lane balancing using resident intelligence and external "Lane Full" or "High Limit" sensors based on specific criteria or when using an external controller such as a PLC or computer to route products to unlimited lanes. Additionally, some embodiments can perform sequential pattern forming/dividing and are able to function as a product-reject device. Some embodiments divert variable length product on-demand. This divert signal can be generated by a variety of methods, including RF tag, vision, bar code and color sensing.

Various embodiments of the present invention include some or all of the following features: aluminum extruded or stainless steel framework; sort by barcode, vision system or other sensors; sort products from 1 to 2 lanes on an individual product basis or divert multiple devices (multiple lane sorting system); ability to run variable product lengths with varied spacing and speed; capable or retrofitting current system; and menu-driven operation for short changeovers.

As the diverting paddles rise and fall, they create a virtual wall with the appropriate number of paddles to create a specially sized moving guide. The wall diverts selected products to an alternate lane increasing production rates, while gently handling products.

FIGS. 1, 2, 3A, 3B, 3C, and 3D depict various views of a conveying system 20 according to one embodiment of the present invention. System 20 includes a conveyor 28 which is transporting a plurality of products 32 in a conveying direction 24 along a conveying path 26. In one embodiment, the conveying path 26 is provided by a plurality of slippable rollers 30 which are rotatably supported by a driven roller shaft. Further information about the operation of slippable roller conveyors can be found in any of the following documents. This application incorporates by reference U.S. Pat. No. 6,516,940, LOW ELECTROSTATIC DISCHARGE CONVEYOR; U.S. Pat. No. 6,193,047, ERGONOMIC WORKSTATION CONVEYOR APPARATUS AND METHOD; U.S. Pat. No. 6,098,786, SLIPPABLE ROLLER CONVEYOR FOR A CLEAN ROOM; and U.S. Pat. No. 3,951,255, CONVEYOR WITH DRIVEN SLIPPABLE ROLLERS; all of the foregoing being incorporated herein by reference. Although what has been shown and described is the use of a slippable roller conveyor, the present invention is not so limited and contemplates diversion of products on any type of conveyor, including roller conveyors that are non-slippable, conveyors surfaces both slippable and non-slippable driven by chain, gear or belt, table top chain conveyors, and belt top surface conveyors.

Figure 2:
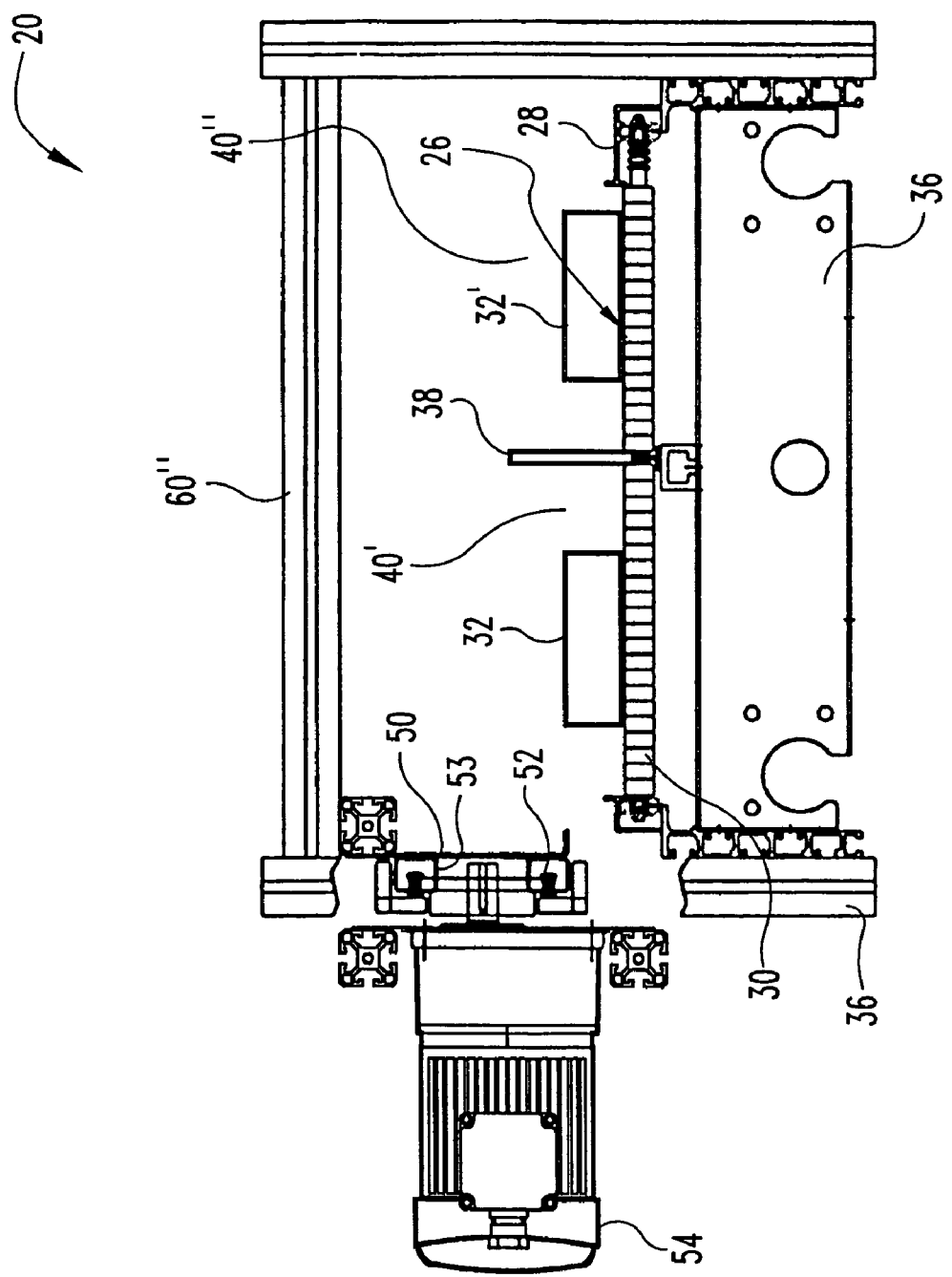
FIG. 2 is a mirror image of an end view of the system of FIG. 1 as taken along lines 2-2 of FIG. 1.

As best seen in FIGS. 1 and 2, in some embodiments conveyor 28 includes a divider 38 that extends longitudinally across portions of conveying-path 26. Divider 38 separates the conveying path into a first channel 40' and a second channel 40", which can be used to feed the conveyed products to multiple downstream stations. Preferably, there is a gap 39 in divider 38 through which a portion of diverter assembly 50 passes. As best seen in FIG. 1, as products 32 approach diverter assembly 50, they can be selectively diverted by one or more paddle assemblies 70, such that a diverted product 32' is pushed and redirected by the extended paddle assembly to move through gap 39 from first channel 40' into second channel 40". Although what has been shown and described are first and second channels that are generally parallel, the present invention also contemplates diversion of products from a first channel into a second, non-parallel channel, and further contemplates diversion products from a first channel into multiple other channels.

Figure 3A:
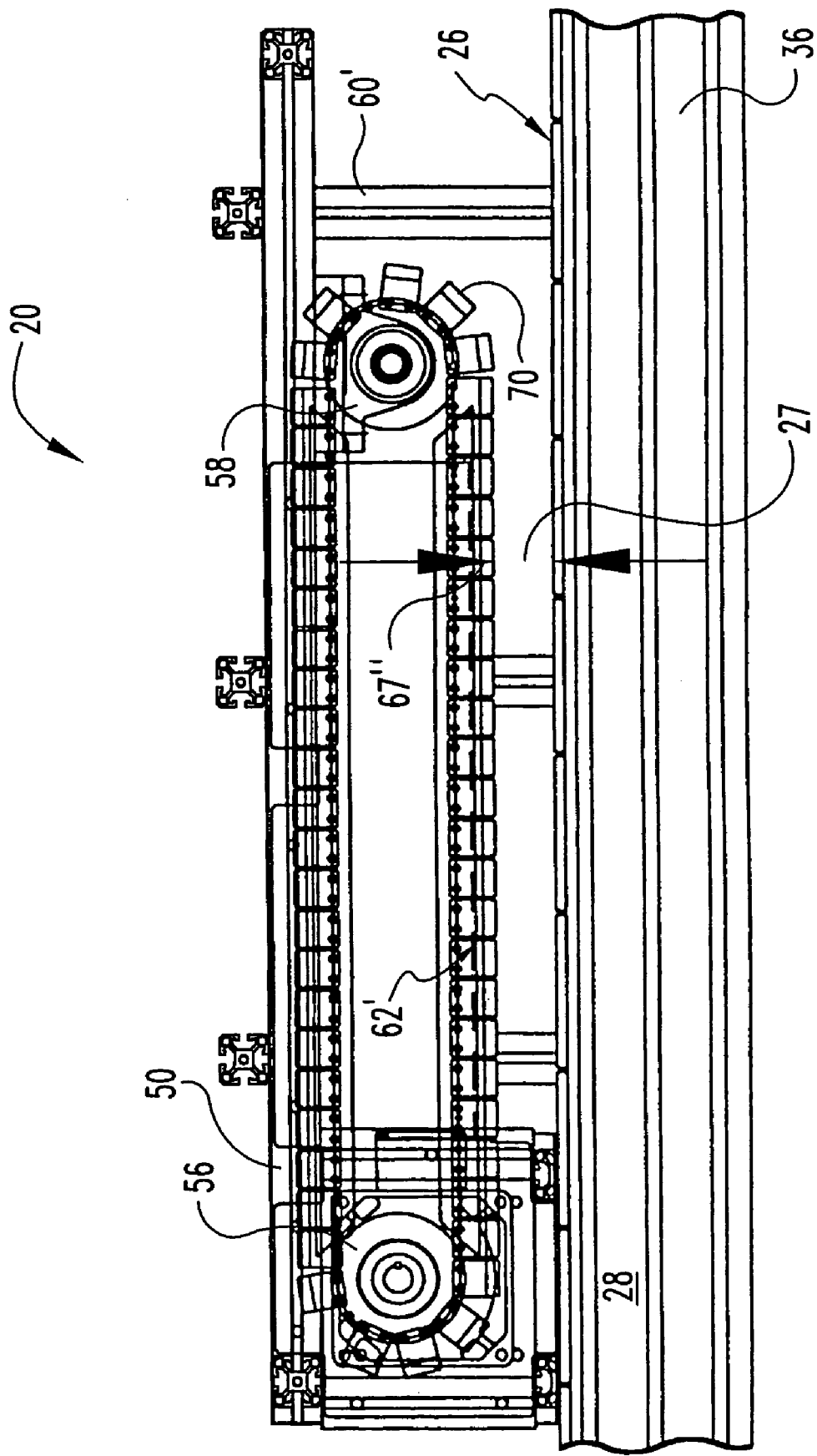
FIG. 3A is a mirror image of a view of the system of FIG. 1 as taken along lines 3-3.

Referring to FIGS. 2 and 3A, it can be seen that diverter assembly 50 includes a plurality of multi-position diverter members or paddle assemblies 70 which are mounted to an endless chain or belt 52. Chain 52 is driven at one end by a motor 54 powering a drive sprocket 56, and supported at the other end by a slave sprocket 58, which is rotatably supported by a pair of bearing supports 59. A plurality of vertical structural members 60' and horizontal structural members 60" provide a support frame for diverter assembly 50. A further understanding of paddle assembly 70 will be provided later in this description by reference to its similarities with paddle assembly 170. Looping of chain 52 around sprockets 56 and 58 results in an upper path 62" of paddle assemblies and a lower path 62' of paddle assemblies. Diverter assembly 50 is coupled to vertical structural members 60' such that there is a clearance height 27 between the conveying path 26 and the lowest surface of lower path 62', as measured when the corresponding paddle assembly 70 is in the fully retracted position 67". This clearance height 27 is established to permit a product 32 to pass underneath the lower path 62' when the paddle assembly is fully retracted. However, if the paddle assembly is placed in the extended position, the length 78 of the paddle portion 76 extends downward a distance preferably less than the clearance height 27. The distal end of the extended paddle portion is preferably above conveying path 26. By this selection of the length 78, the extended paddle does not touch any of the rollers 30. This permits diverter assembly 50 to be located along conveyor 28 without reference to any special roller shafts or rollers. However, some embodiments of the present invention contemplate paddle lengths whose distal ends extends below the conveying surface when fully extended, such that one or more rollers are removed from the corresponding shafts to prevent interference between the paddle and the roller.

In those embodiments in which the distal end of the paddle extends below the conveying path in the fully extended position, it is preferable to provide a conveyor having multiple slippable rollers on each roller shaft. It is then possible to have the diverter assembly cross over the conveying path, with a pathway for the distal paddle ends being providing by selective removal of individual rollers on a plurality of adjacent roller shafts. Further, it is possible to provide this configuration of modified conveyor and still obtain use of a standard roller shaft, and not require the use of a special roller shaft.

The frame structure of diverter assembly 50 is coupled to the structure of conveyor 28 so as to form an angle 42 between the lower path of the paddles and the direction of the conveying. As angle 42 decreases, there is less force applied by the extended paddles to divert the product from the first conveying the channel 40' to the second conveying channel 40". Preferably, diverter assembly 50 is non-parallel and non-perpendicular to the path of conveyor 28. In some embodiments, the angle 42 ranges from about 20 degrees to about 70 degrees. By using a slippable roller conveyor, it is possible to establish the proper angle without the need to remove rollers or have special roller shafts. Therefore, a single diverter assembly can be used at different times on the same conveyor at different angle. In those embodiments in which the distal end of the paddles remains above the conveying path, it is possible to achieve any angular orientation between the diverter assembly and the conveyor without removing any rollers from the conveyor or using any special roller shaft.

In some embodiments of the present invention, the length 78 of paddle 76 is adapted and configured to be about the same as the height of the product or greater than the height of the product being diverted. In other embodiments, the length of the paddle assembly is adapted and configured to extend downward from the lower paddle path to a position below the center of gravity of the product being conveyed. The use of paddles having lengths as described results in increase stability of the product being diverted, with less chance of tip-over, since the distal end of the paddle extends to a position between the conveyor path and the product center of gravity. This increased stability of the diverted products permits both the conveyor 28 and diverter assembly 50 to run at increased speeds. In some embodiments, the speed of the paddle upper path and paddle lower path is about 400 ft per minute. In those embodiments including a slippable roller conveyor, the speed of the diverter member can be chosen to limit the acceleration forces moving the diverted object, without concern for damage to the product, because of the slippable nature of the rollers.

In some embodiments the speed of the paddle path is selected such that there is little or no slippage between the diverted product and the paddle surface. This can be achieved by establishing a diverter path speed substantially equal to the speed of the conveying path of conveyor 28 divided by the cosine of angle 42. By matching the conveying speed and the diverting speed in this manner there is little or no abrasion of the paddle against the product. As the product is diverted from one conveying channel to another the product slides laterally over the tops of the slippable rollers. In other embodiments the speed of the paddle path is selected to be less than the speed of the conveying path divided by the cosine of the angle. In these embodiments, the diversion of a product by the diverter members can result in stoppage of one or more slippable rollers. However, by use of slippable rollers the slippage occurs between the roller shaft and the roller, with little or no slippage between the roller and the diverted product.

In some embodiments of the present invention it is desired to limit the acceleration force applied to the diverted products. As one example, for a product having an acceleration limit of 20 gs, the diverter assembly includes drive and return sprockets having 5 inch diameters, the lowest surface of the retracted paddle being about 2 inches below the diameter of the pulley, the motor running at about 450 rpm, and the belt holding the paddles moving at about 590 feet per minute.

Figure 3B:
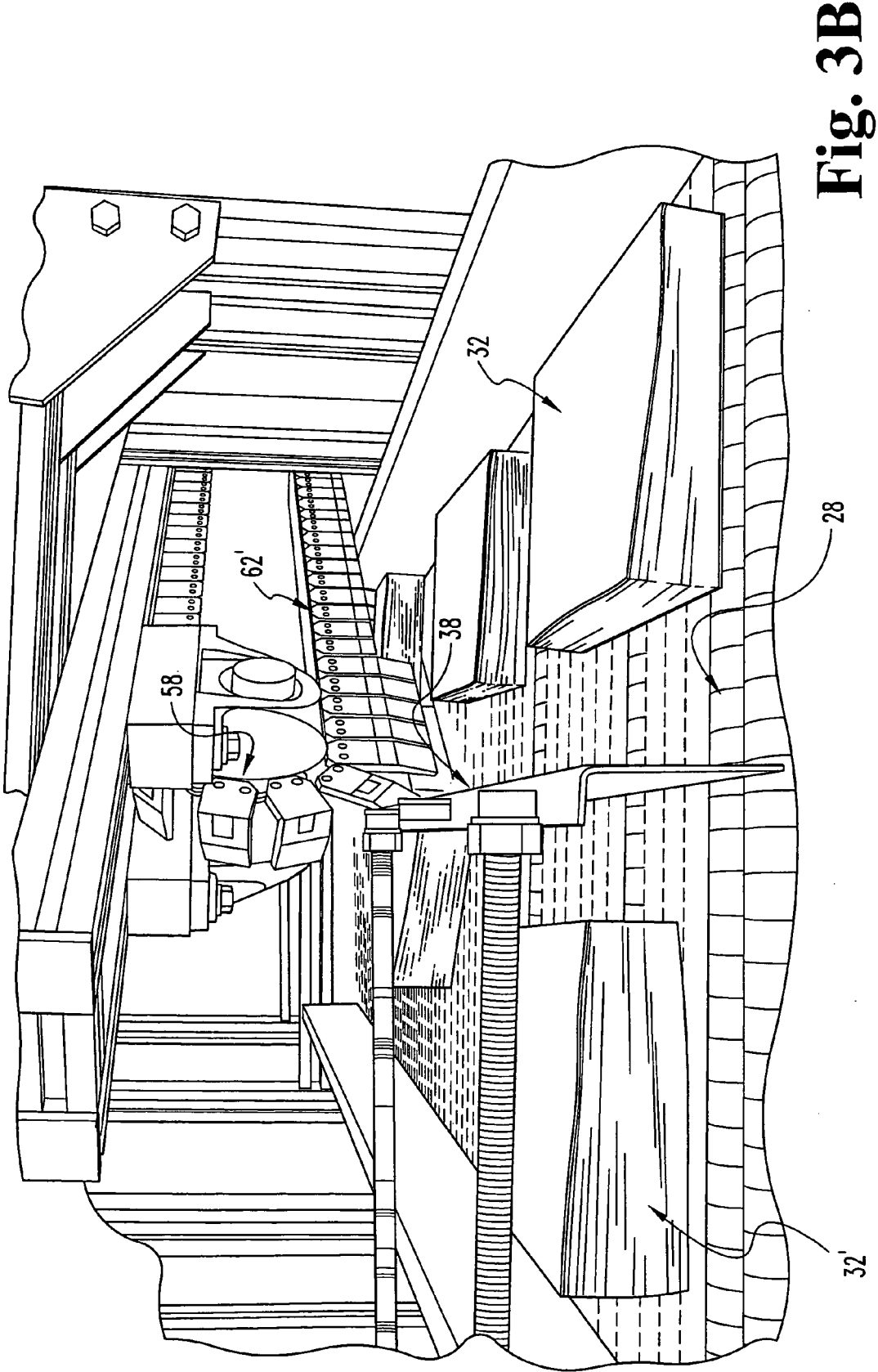
FIG. 3B is an end and top perspective view of the conveying system of FIG. 1.

FIGS. 3B, 3C, 3D, and 3E are taken from photographs according to one embodiment of the present invention. FIG. 3B is an end perspective view longitudinally along conveyor 28. The second channel 40" is shown on the left of FIG. 3B, including two diverted products 32'. The non-diverted products 32 are shown on the right side of FIG. 3B in the first channel 40'. A diverter 38 separates channels 40' and 40".

Figure 3C:
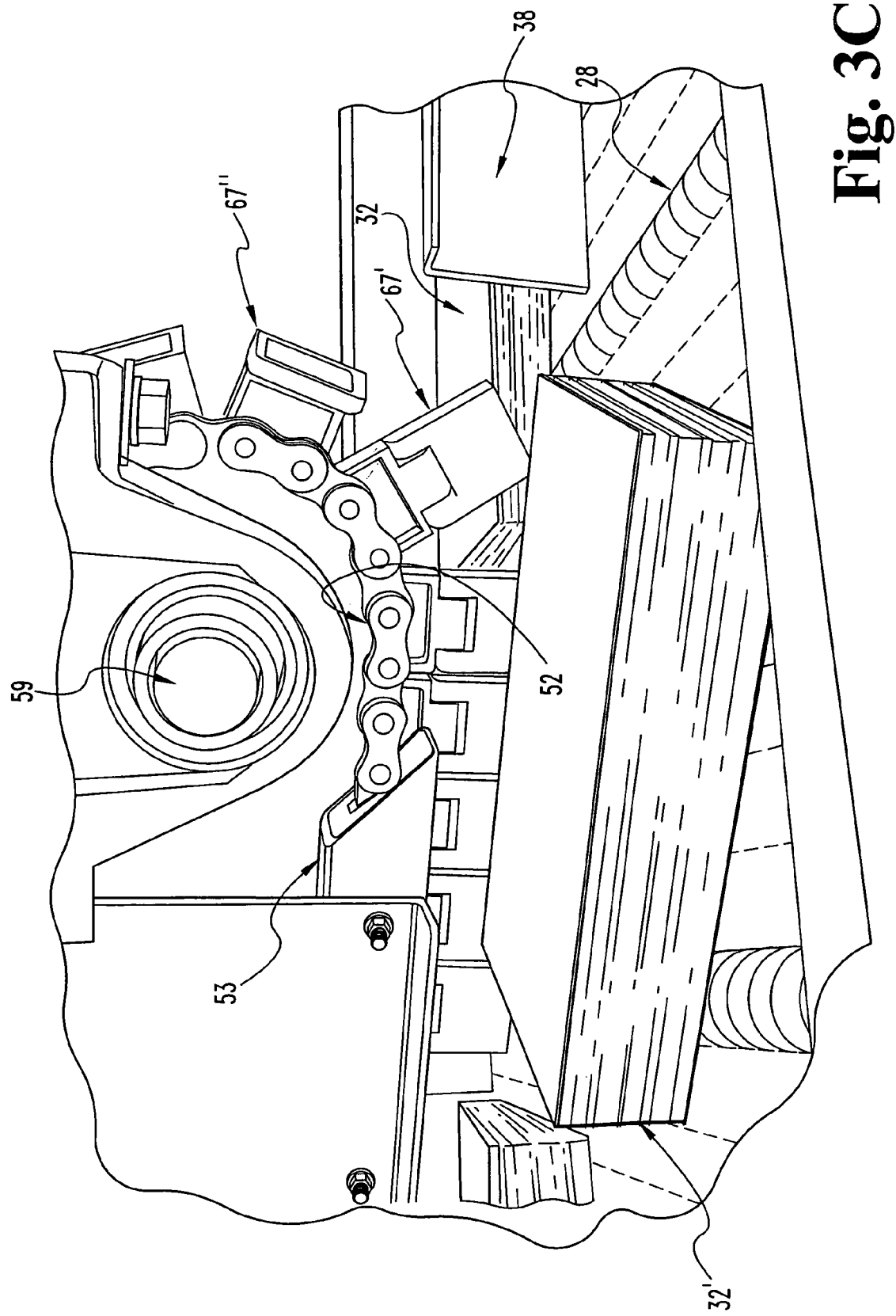
FIG. 3C is a side perspective view of a portion of the system of FIG. 1.

FIG. 3C shows a portion of a conveying system proximate to the gap 39 along divider 38. A diverted product 32' is shown passing through gap 39 under the influence of a plurality of paddle assemblies 70 in the extended position 67'. FIG. 3C also shows a paddle assembly 70 in the fully retracted position 67". The paddle assemblies are attached to chain 52. Chain 52 is directed through a chain guide 53 around a slave sprocket 58 supported by a pair of bearing supports 59.

Figure 3D:
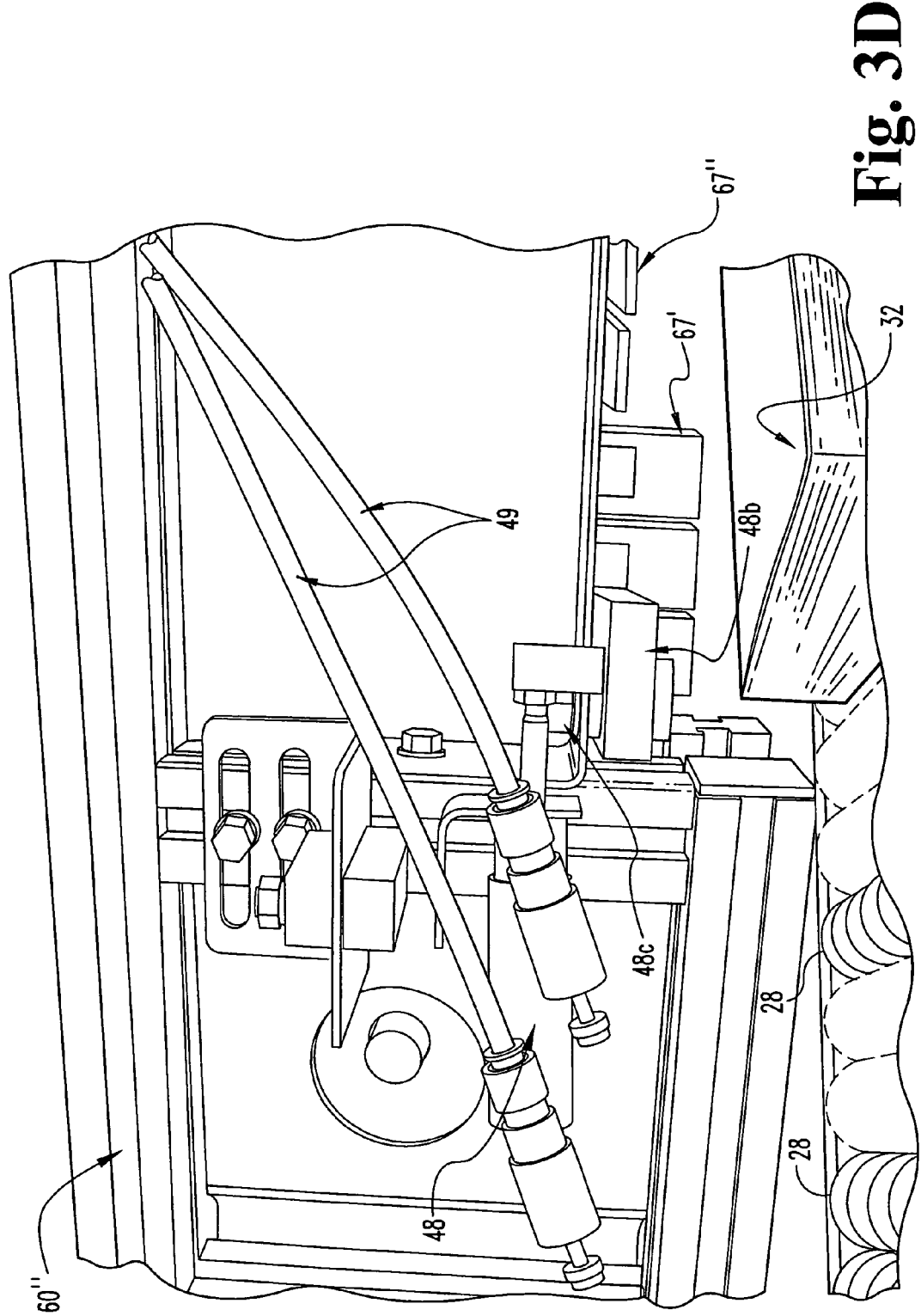
FIG. 3D is a side perspective view of a portion of the system of FIG. 1.

FIGS. 3D and 3E depict one embodiment of an actuator assembly 48 for changing the position of the paddle assemblies 70. In one embodiment, actuator assembly 48 includes a pneumatically driven piston and rod contained within a cylinder. Actuating rod 48A extends from one end of the actuator housing and pushes against a block 48B which is coupled by pivot 48C to a vertical structural member 60'. As rod 48A extends, block 48B pivots about pivot 48C, and one corner of block 48B presses against the paddle 76 of a paddle assembly 70 of the lower path 62' passing proximate to actuator 48. One or more springs (not shown) return actuator 48 to its original position. A pair of pneumatic lines 49 provide pressurized gas to the pneumatic cylinder.

Figure 4:
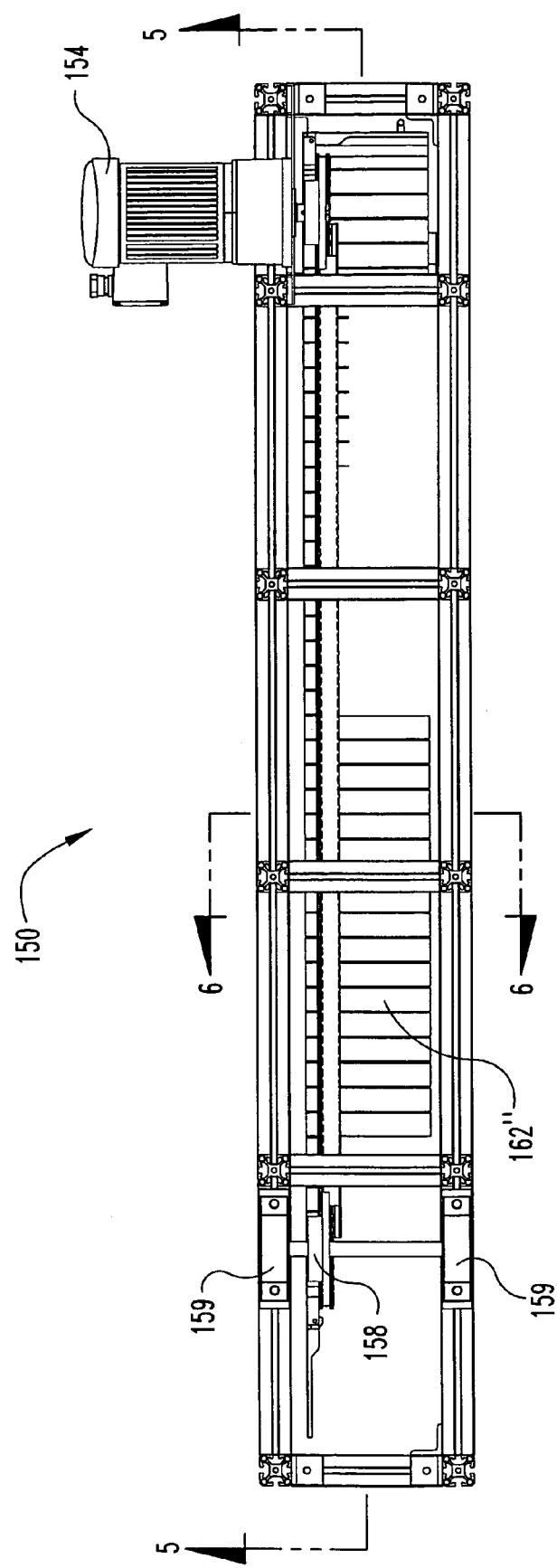
FIG. 4 is a top view of a diverter assembly according to another embodiment of the present invention.
Figure 5:
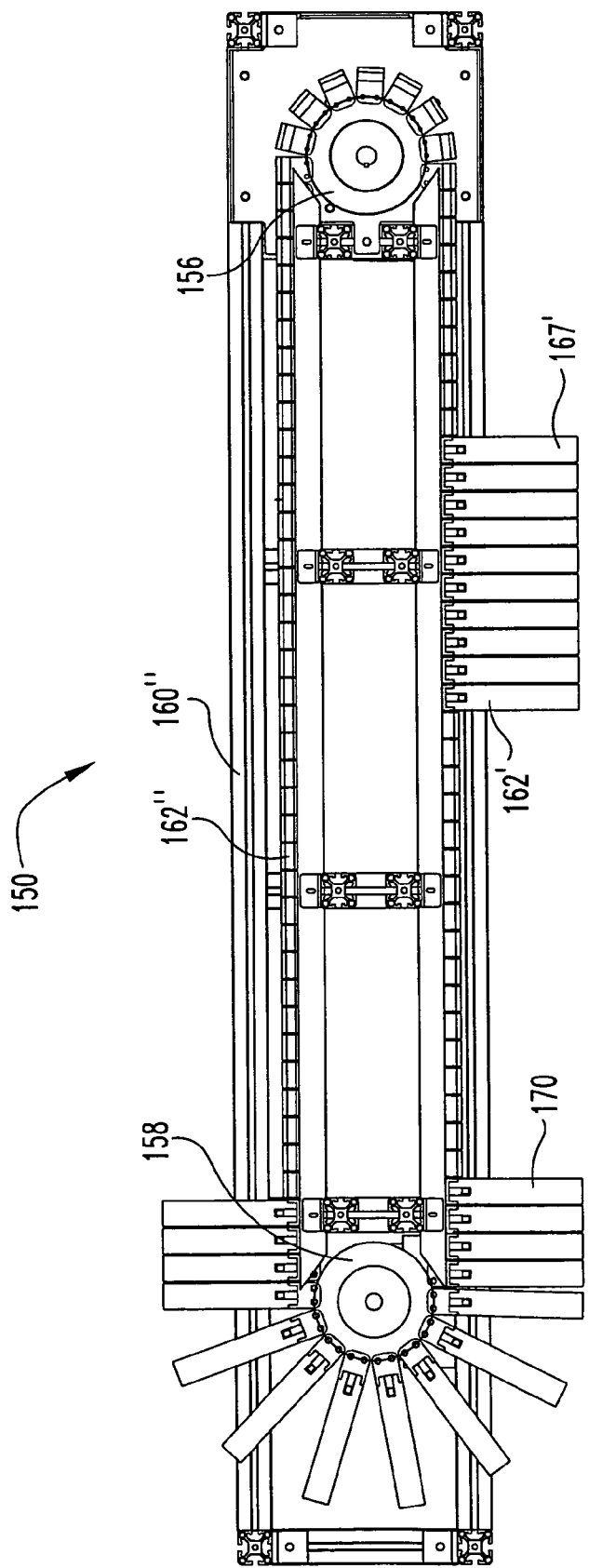
FIG. 5 is a view of the assembly of FIG. 4 as taken along line 5-5.
Figure 13:
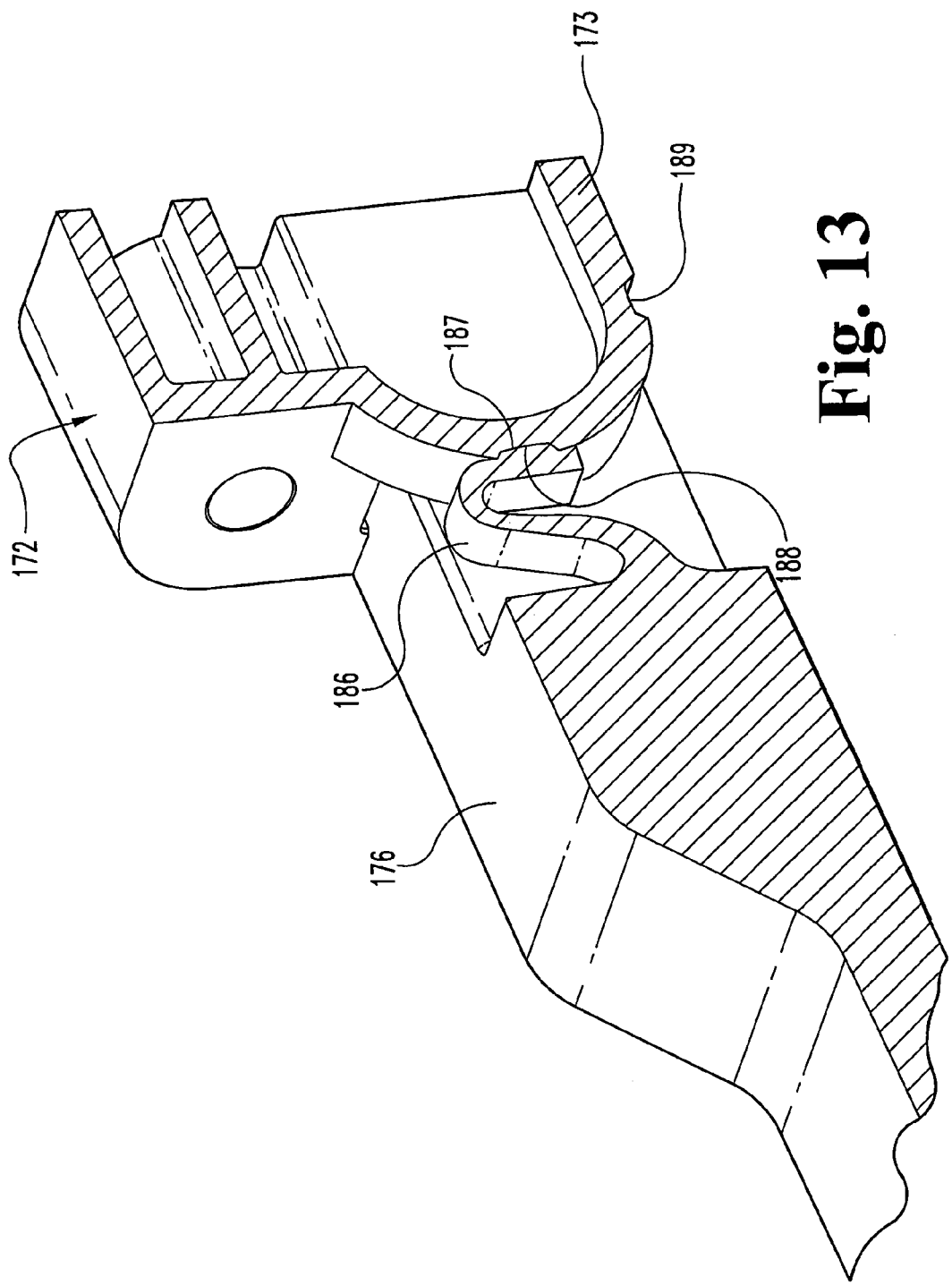
FIG. 13 is a cross sectional view of the paddle assembly of FIG. 9 as taken along line 13-13 of FIG. 9.

FIGS. 4, 5, and 6 depict a diverter assembly 150 according to another embodiment of the present invention. The use of a hundred-series prefix (NXX) in front of an element number (XX) indicates an element that is the same as the non-prefixed element number, except for those changes shown or described.

Diverter assembly 150 is constructed similarly to diverter assembly 50, except that paddle assemblies 170 incorporate a paddle 176 having a length 178 that is greater than the length 78 of paddle 76. The use of a longer length 178 permits diverter assembly 150 to be supported a greater clearance height 127 above the corresponding conveyor path 126. Therefore, a taller product 132 can pass underneath the lower path 162' when the corresponding paddle assembly 170 is placed in the fully retracted position 167". In a preferred embodiment, the length 178 or 78 is chosen such that the distal end of the paddle extends downward to a point between the center of gravity of the diverted product and conveyor path 26.

FIG. 6 is a cross-sectional view of diverter assembly 150. This cross-sectional view is similar to a cross-sectional view of diverter 50, except for the length of the paddle portion 176 of paddle assembly 170. Diverter assembly 150 includes an upper path 162" of paddle assemblies 170 coupled to a chain 152, and a lower path 162' comprised of an assembly of paddles 170 coupled to another portion of chain 152. Paddle assemblies 170 are shown in the fully retracted position 167" in FIG. 6.

Diverter assembly 150 includes one or more paddle stops 164a preferably mounted to static structure of assembly 150 proximate to the location of actuator assembly 48. Paddle stop 164 is adapted and configured to stop excess motion of a paddle portion 176 as it is actuated to the extended position 167'. FIG. 6 shows a single paddle in dotted lines in the extended position 167'. Stop 164 includes an abutting surface 164a which is approximate and opposing face 176a of the extended paddle. Stop 164 thereby limits any over travel of a paddle 176 as it rotates to the extended position, whether from the force applied by actuator 148 or by the inertia of the paddle as it pivots. In some embodiments, paddle stop 164 and paddle assembly 170 are adapted and configured such that substantially all overtravel of the rotating paddle 176 is limited by stop 164. In these embodiments, the connector portion 172 of the overtraveling paddle assembly does not have to react the overtraveling load. In other embodiments, paddle 176 and connector 172 are adapted and configured such that some overtravel protection is provided even in the absence of a paddle stop 164.

Some embodiments of diverter assembly 150 also include one or more paddle stops 164b preferably mounted to static structure of assembly 150 proximate to means 190 for returning a diverter member to an initial position. As one example, paddle stop 164b is placed along a surface of chain guide 53, preferably proximate to second end 196 of paddle return guide 192. Further description of return means 190 is provided later, by reference to its similarities to means 290.

FIG. 6 shows the chain or belt 152 located within a C-cross section guide 153. Individual paddles assemblies 170 are fasten to chain 152 by connector 172.

FIGS. 7-13 depict a paddle assembly 170 according to one embodiment of the present invention. Paddle assembly 170 is preferably comprised of a connector 172 which pivotally supports a paddle 176. Connector 172 includes a pair of ears 184 which pivotally couple to a pair of axle protrusions 182 located on opposite sides of one end of paddle 172, forming a hinge joint 180. Paddle 176 can pivot relative to connector 172 from the fully extended position 167' (shown in FIGS. 7 and 8), to a partially retracted position 167" (shown in FIG. 10), or to a fully retracted position 167" (shown in FIG. 9). In one embodiment, paddle 176 is capable of a range of motion of about 90 degrees relative to connector 172.

The coupling of paddle 176 to connector 172 includes means for holding a position of the paddle relative to the connector. Connector 172 includes a central member 173 which includes a first detent 188 and a second detent 189. Paddle assembly 176 preferably includes a molded spring 186 which includes a protrusion or rib 187. Protrusion 187 is adapted and configured to be received within first or second detent 188 or 189 respectively. Spring 186 presses rib 187 into the corresponding detent, and thereby maintains the relative position of connector 172 relative to paddle 176. First detent 188 is located along central member 173 so as to establish the fully retracted position of paddle 176 relative to connector 172. Second detent 189 is located along central member 173 so as to establish the fully extended position of paddle 176 relative to connector 172. Connector 172 includes a pair of attachment roles 174 through which a pair of fasteners couple paddle assembly 170 to chain 152.

In some embodiments both the connector 172 and paddle 176 are fabricated from plastic. In one embodiment the connector is fabricated from a 6/6 nylon with 10 percent TFE and 30 percent glass. In another embodiment the paddle is fabricated from 6/6 nylon with 5 percent TFE and 40 percent glass.

Figure 14:
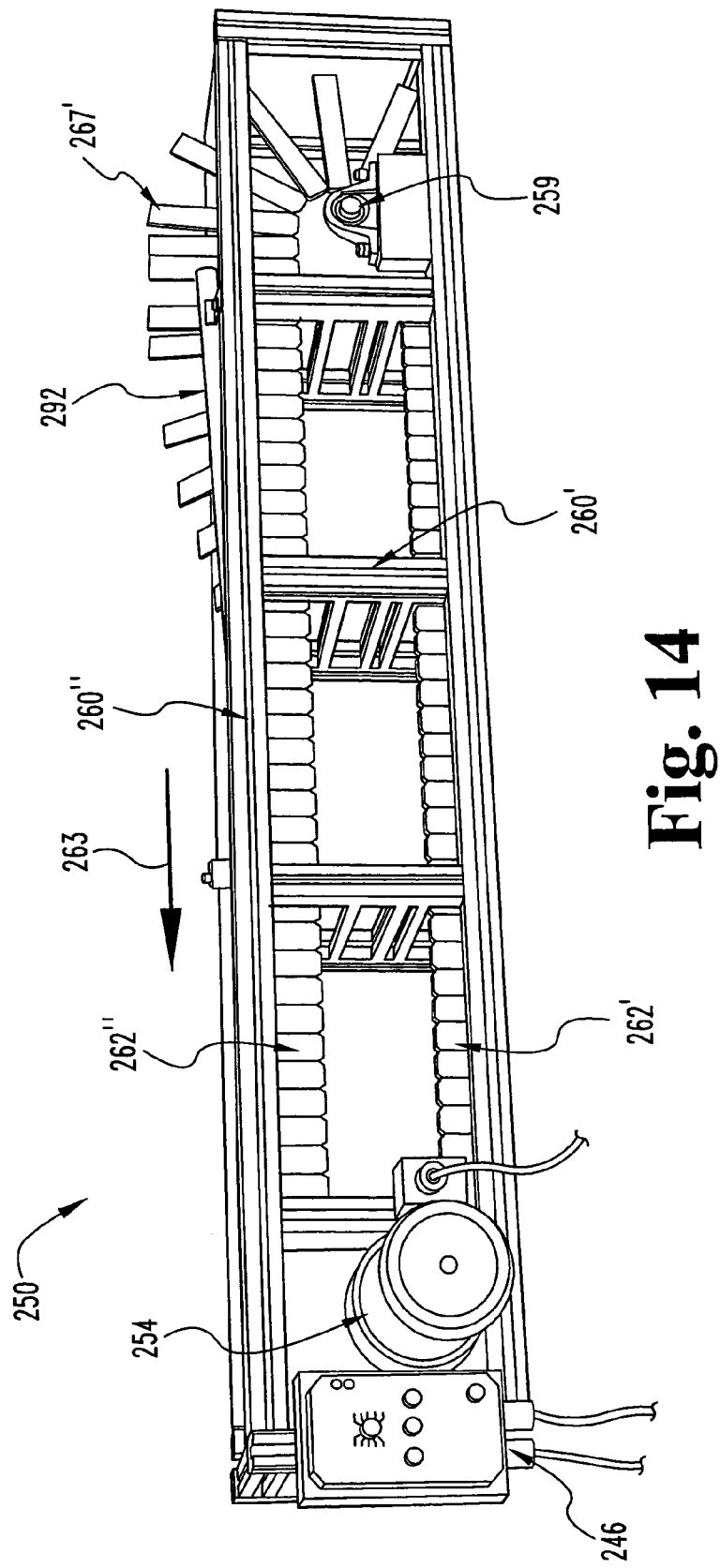
FIG. 14 is a side and top perspective view of a diverter assembly according to another embodiment of the present invention.
Figure 15:
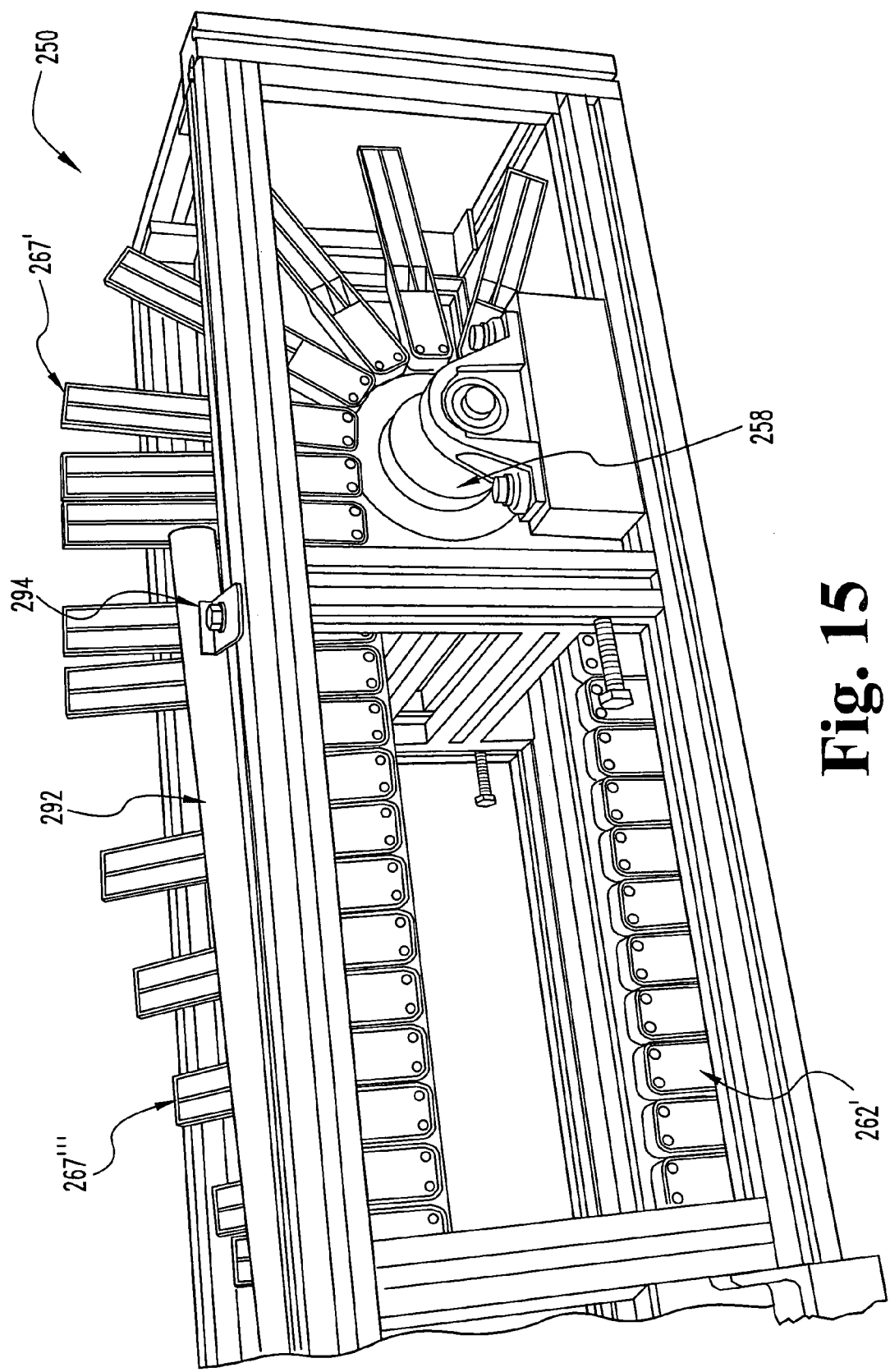
FIG. 15 is a side and top perspective view of a portion of the diverter assembly of FIG. 14.
Figure 16:
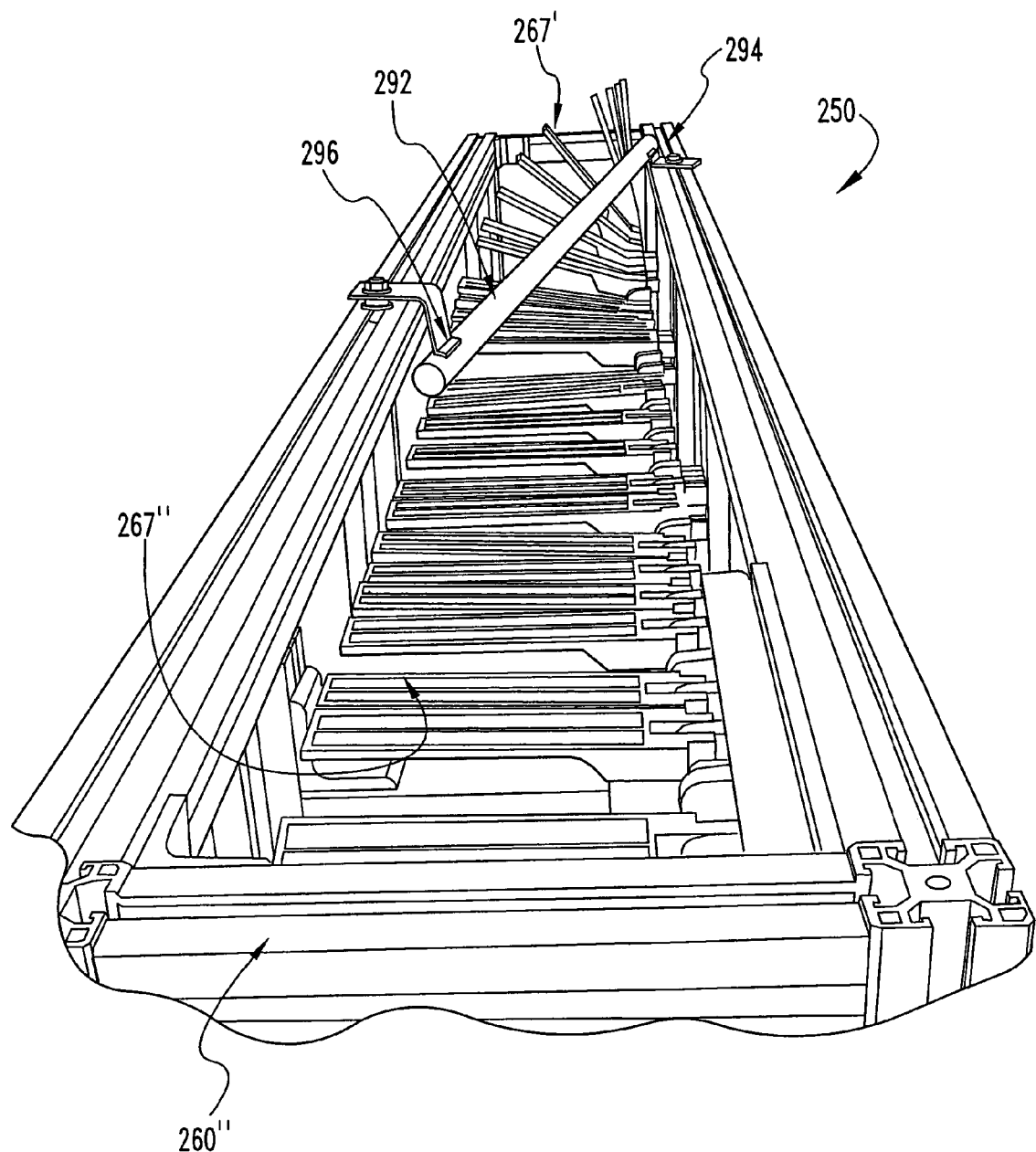
FIG. 16 is a top and end perspective view of the diverter assembly of FIG. 14.

FIGS. 14, 15, and 16 depict a diverter assembly 250 according to another embodiment of the present invention. As shown in these figures, diverter assembly 250 is shown attached to a workbench, but it is understood that diverter assembly 250 can be used in conjunction with a conveyor 228 as part of a conveying system 220.

Diverter assembly 250 includes a motor 254 operated by a motor controller 246 and driving a chain 252 with a drive sprocket 256 and a slave sprocket 258. Diverter assembly 250 includes an upper, return path 262" moving in a direction 263, which loops to a lower, diverting path 262' moving in a direction opposite to direction 263.

Diverter assembly 250 includes means 290 for returning a diverting member 270 to an initial position. This returning means includes a paddle return guide 292 suspended above a portion of upper path 262". In one embodiment, return guide 292 is comprised of a circular cross-section bar with two ends, a first end 294 being supported along the chain side of upper path 262" (as best seen in FIG. 16), and a second end 296 preferably supported over the paddle distal end portion of upper path 262". In other embodiments, first end 294 is located at a first, greater elevation above upper path 262", and second end 296 is located at a second, lower height above the upper path.

However, in other embodiments of the present invention the paddle return guide is substantially parallel to the upper paddle path, and is angled such that one end of the guide is located proximate to the chain portion of the upper path, with the pipe being angled relative to the upper path so as to crosswise span at least a portion of the width of the track, as well as a portion of the length of the track. In yet another embodiments, the paddle return guide is non-parallel to the upper path, such that the first end of the guide is located a first, greater elevation above the upper path, and the second end of the guide is located at a second, lower elevation above the upper path. The paddle return guide 292 shown in FIGS. 14, 15, and 16 is angled relative to upper path 262 in relation to both elevation relative to the upper path and also in spanning at least a portion of the width of the upper path.

As best seen in FIGS. 15 and 16 paddle assemblies 270 in the extended position rotate up and around slave sprocket 258. The back surface of the extended paddle contacts a surface of return guide 292. As chain 252 continues to move the extended paddle along the upper path, the paddle portion 276 remains in contact with the surface of the return guide. As best seen in FIG. 16, since the return guide 292 decreases in elevation and also moves spanwise across the width of the upper path, the moving, extended paddles are forced toward the fully retracted position 267" by the motion of the upper path. Preferably, paddle return guide 292 is attached to static structure of diverter assembly 250. In one embodiment, return guide 292 has a substantially circular cross-section.

Figure 17:
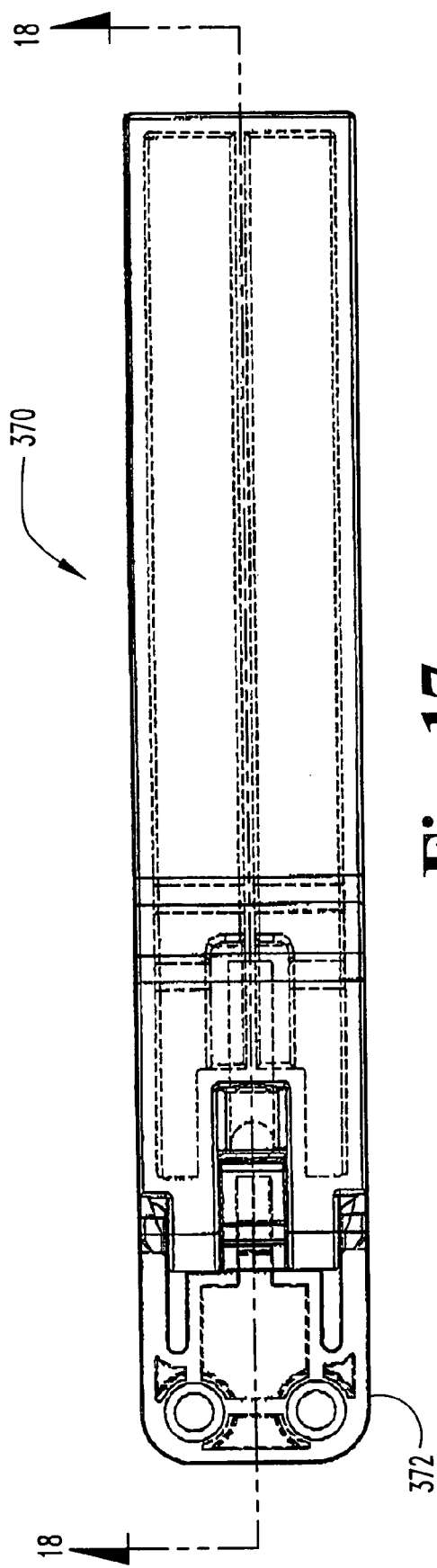
FIG. 17 is a top plan view of a paddle assembly according to another embodiment of the present invention.
Figure 18:
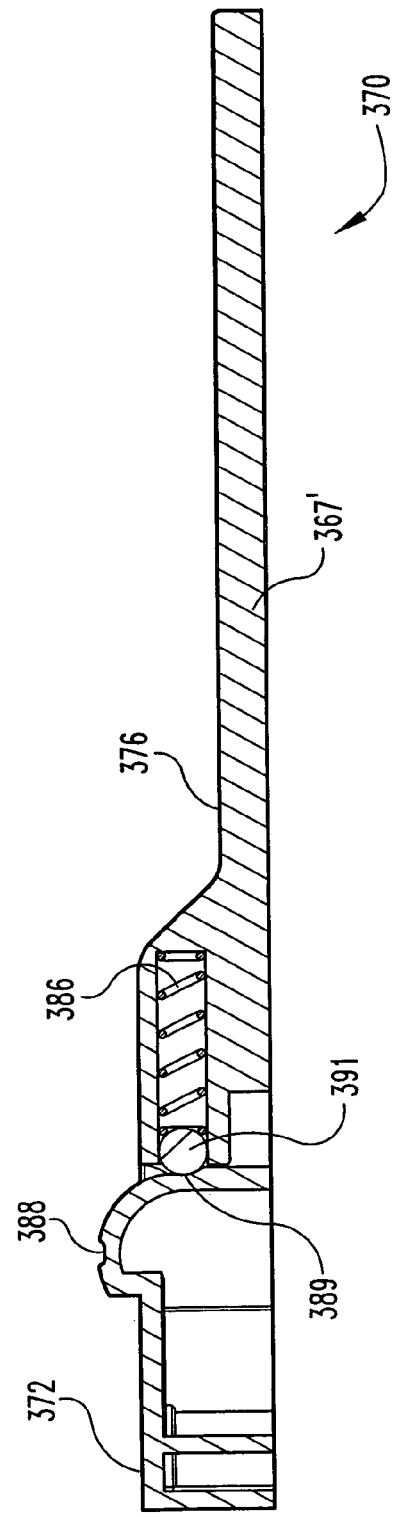
FIG. 18 is a cross sectional view of the paddle assembly of FIG. 17 as taken along line 18-18 of FIG. 17.

FIGS. 17 and 18 show a paddle assembly 370 according to another embodiment of the present invention. Paddle assembly 370 is similar to paddle assembly 270, except that the means for holding the position of paddle 376 relative to connector 372 includes a ball 391 which is pressed into a corresponding detent 388 or 389 by a spring 386 placed within an internal pocket of paddle 376.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A system for conveying objects on a conveyor along a first path and in a first direction, comprising:
    a plurality of articulatable diverting members moving along a second path in a second direction, the second path being above the first path, the second direction being nonparallel and nonperpendicular to the first direction, said diverting members being articulatable between a first non-diverting position above the first path and a second diverting position;
    an actuator for changing said diverting member from one of the first position or the second position to the other of the first position or the second position;
    wherein the included angle between the first path and the second path is more than about 20 degrees and less than about 70 degrees, the first path moves at a first speed, the second path moves at a second speed, and the second speed is less than the first speed divided by the cosine of the included angle.

2. The system of claim 1 which further comprises a plurality of roller shafts each supporting at least one roller and located along the first path, wherein each said roller is slippable about the corresponding said roller shaft.

3. The system of claim 1 wherein in the first position said diverting member does not contact an object being conveyed along the first path, and in the second position said diverting member contacts an object being conveyed along the first path.

4. The system of claim 3 which further comprises a plurality of roller shafts each supporting at least one roller and located along the first path, wherein each said roller is slippable about the corresponding shaft.

5. The system of claim 1 wherein said diverting members move along a third path above the second path in a third direction opposite to the first direction.

6. The system of claim 5 comprising a stationary guide for returning said diverting member from the second position to the first position as the diverting member moves along the third path.

7. The system of claim 6 wherein said stationary guide has an outer surface for sliding contact with said diverting member in the second position, at least a portion of the outer surface being adapted and configured to converge toward said third path in the third direction.

8. The system of claim 1 which further comprises an endless member arranged in a loop, at least a portion of the loop being above the first path said articulatable diverting members being coupled to said endless member.

9. The system of claim 1 wherein each object has a center of gravity, and said diverting members are adapted and configured to have a distal end located between the first path and the center of gravity in the extended position.

10. The system of claim 1 which further comprises a stationary member located proximate to the second path and adapted and configured to contact at least one said diverting member and to limit overtravel as said member articulates between the first position and second position.

11. The system of claim 1 wherein the second diverting position of said diverting member is above the first path.

12. The system of claim 1 which further comprises a flexible member moving in a loop above the first path wherein said diverting members are coupled to said flexible member.

* * * * *